F. D. HOLDSWORTH.
AUTOMATIC DAMPER FOR COMPRESSED AIR REHEATERS OR THE LIKE.
APPLICATION FILED JAN. 14, 1911.
1,187,525.
Patented June 20, 1916.
2 SHEETS—SHEET 1.
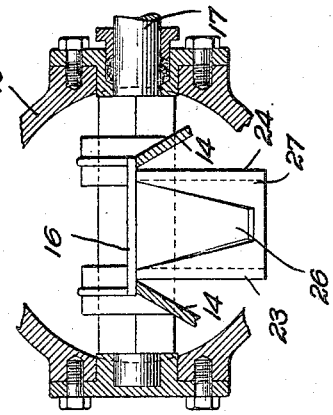
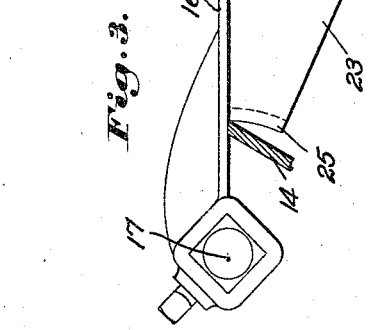
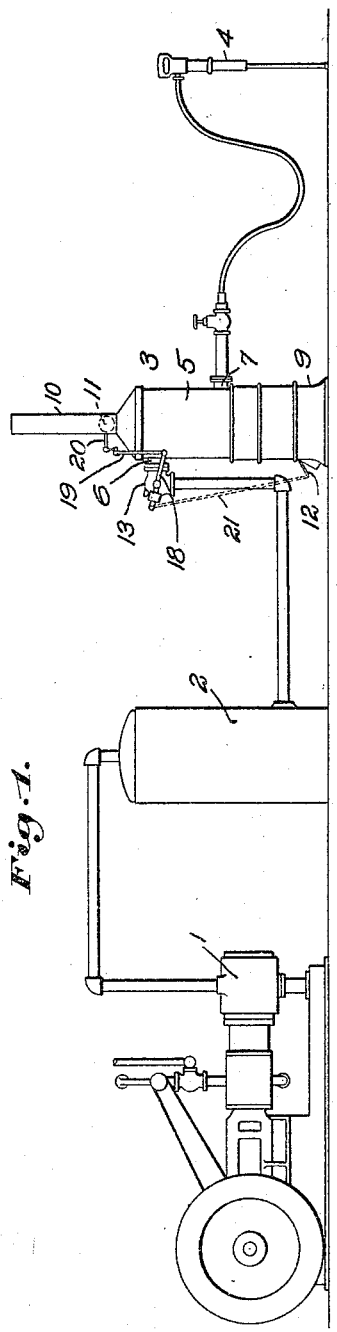
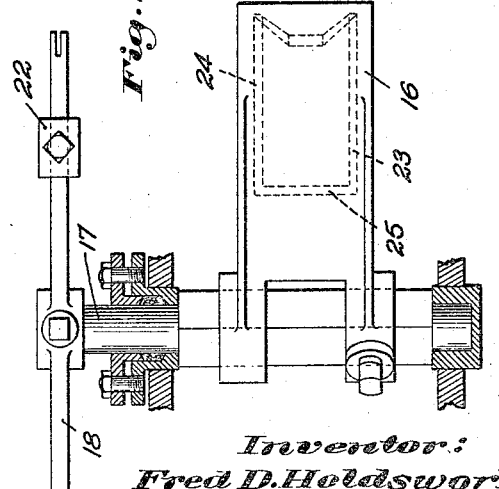
Witnesses:
Horace A. Crossman
Ernest A. Felber
Inventor:
Fred D. Holdsworth
by Emery, Booth, Janney & Varney
Att'ys.

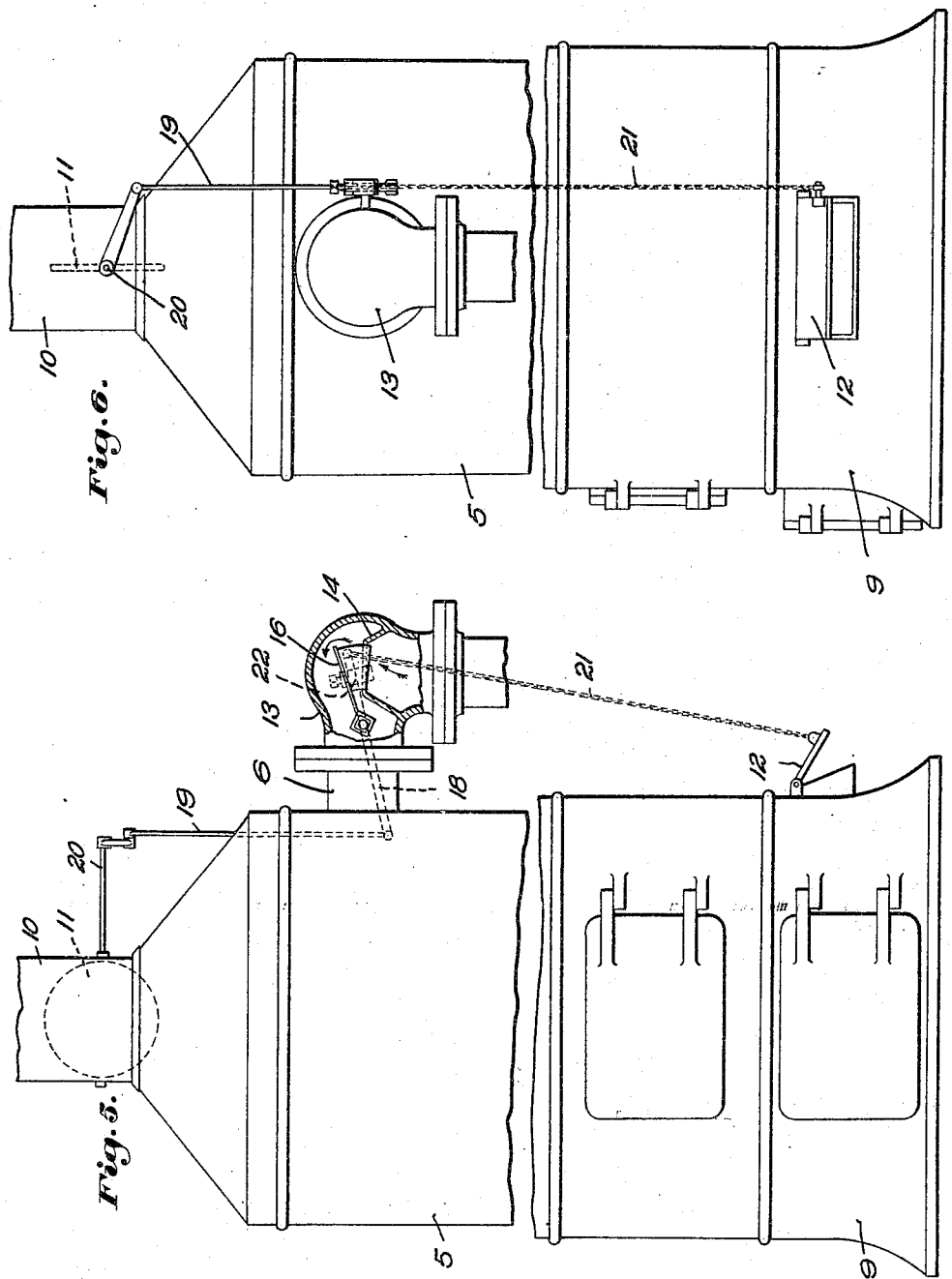

UNITED STATES PATENT OFFICE.

FRED D. HOLDSWORTH, OF CLAREMONT, NEW HAMPSHIRE, ASSIGNOR, BY MESNE ASSIGNMENTS, TO SULLIVAN MACHINERY COMPANY, OF BOSTON, MASSACHUSETTS, A CORPORATION OF MASSACHUSETTS.

AUTOMATIC DAMPER FOR COMPRESSED-AIR REHEATERS OR THE LIKE.

1,187,525.  Specification of Letters Patent.  Patented June 20, 1916.

Application filed January 14, 1911. Serial No. 602,650.

*To all whom it may concern:*

Be it known that I, FRED D. HOLDSWORTH, a citizen of the United States, and a resident of Claremont, county of Sullivan, State of New Hampshire, (whose post-office address is Claremont, New Hampshire,) have invented an Improvement in Automatic Dampers for Compressed-Air Reheaters or the like, of which the following description, in connection with the accompanying drawings, is a specification, like letters on the drawings representing like parts.

This invention relates to automatic damper regulators, being more particularly, though not exclusively, intended for the regulation of the heat of combustion in a reheater for compressed air systems where the compressed air passing through the reheater is variable, due to the intermittent use of drills, motors, or other air-consuming devices, which may be fed from the system.

In the case of air systems the consumption of air is apt to vary within very wide limits. When the full capacity of the system is taxed and a rapid flow of air takes place through the reheater, it may be necessary to force the latter to its utmost to increase the temperature of the air to the required point. On the other hand when the consumption of air is low, the heat of combustion should be checked in order to prevent injury to the reheater, as well as to save unnecessary consumption of fuel. The fluctuations of air consumption in a compressed air system employing a number of drills or other tools are very great and it is difficult, even by close personal attention to the reheater, to properly regulate the same so that the heat of combustion is even approximately proportioned to the amount of air passing therethrough. Not only is there a great waste of fuel at a reheater, but its heating surfaces are very short lived and soon have to be replaced mainly on account of the abuse which they receive, due to this cause.

One object of the invention is to provide such an automatic regulation of the heat of combustion that it will be automatically proportioned to the quantity of air passing through the air conduits of the reheater and the heating surfaces so that the latter will always receive a sufficient quantity of heat to heat the air contacting therewith when the air velocity is high, but will, nevertheless, be protected against an excess temperature when the flow of air is reduced.

The invention will be best understood by reference to the following description when taken in connection with the accompanying illustration of one specific embodiment thereof, while its scope will be more particularly pointed out in the appended claims.

In the drawings: Figure 1 shows a diagrammatic view representing the component parts of a compressed air system employing an air reheater equipped with one form of the invention; Fig. 2 shows the air valve in plan; Fig. 3 shows the air valve in side elevation; Fig. 4 shows the air valve in end view; Fig. 5 shows the reheater in side elevation and the connections between the damper and air valve; and Fig. 6 shows the reheater in end elevation.

Referring to the drawings, in Fig. 1 I have shown, for purposes of illustrating one application of this invention, the component parts of a compressed air system, the same comprising the compressor 1 adapted to supply compressed air to the receiver 2 from whence it passes through the reheater 3 to the consuming devices, the latter comprising, by way of example, one or more rock drills 4 or other motors or devices. The construction of the compressor, receiver, drills and other tools do not form any essential part of this invention, the same being shown for purposes of illustration.

The reheater 3 may be of any suitable or ordinary construction, but will commonly comprise a casing 5 (Figs. 5 and 6) containing a suitable combustion chamber to which is exposed appropriately shaped heating surfaces which contain the compressed air and form a conduit therefor through which it passes from the entrance end 6 through the combustion chamber to the exit end 7 (Fig. 1). Such a form of reheater is shown in my copending application, Serial No. 314,468, filed April 30, 1906.

Any suitable kind of fuel may be employed, the reheater shown being constructed for the use of coal or the like and provided with a fire box at 8, an ash pit 9 and an escape flue 10 for the products of combustion. The heat of combustion in the illustrated form of reheater is affected by regulating the drafts at the escape flue and the ash pit, there being provided for this purpose a damper 11 in the escape flue and a second damper 12 at the ash pit, the latter controlling the access of air to the fuel in the fire box 8. Obviously other heat regulating means may be employed and the dampers, if utilized, may be located elsewhere than in the particular places shown, the same being herein illustrative only of one form of the invention.

The dampers are so proportioned that when wide open they force the reheater to its utmost capacity and when closed they check the fire to such a low point that no damage can result if there is no compressed air passing through the reheater.

To regulate the dampers the air conduit is provided with a gate or valve automatically movable in response to the flow of air in the reheater. This may be located at any suitable position in the conduit, but herein it is placed at the inlet end thereof in an elbow 13 which forms a part of the conduit thereat. Such elbow is provided with a transverse partition wall 14 having a rectangular opening and forming a seat for the swinging valve 16. This valve is hinged on a rock shaft 17 which passes out of the walls of the elbow through a suitable stuffing box. The rock shaft 17 is connected herein by means of a lever 18 attached to one end thereof, the link 19 and the rock shaft 20, to the damper 11, so that when the valve 16 is closed, indicating that no air is passing through the reheater, the damper is also closed. As the valve opens, however, the damper opens, the parts being so designed that the opening of the damper is proportioned to the opening of the valve and to the quantity of air passing therethrough. The rock shaft 17 is also connected to the lower damper 12 herein by means of the lightweight chain 21 attached to the opposite end of the lever 18 so that the damper 12 is similarly controlled. The lever 18 is weighted as at 22, and additional weights may be applied as required, so that, when no air is passing through the reheater, the valve will automatically close and cause the dampers to close. When the flow of compressed air begins, however, the valve will lift by an amount dependent upon the quantity of air passing and will therefore open the dampers by an amount proportional to such quantity.

It is desirable that the variations in air consumption effect a relatively large movement of the valve and that, as the flow of air lifts the valve, the effective area of the opening produced by such movement of the valve should increase slowly. To provide for a long swing of the valve with increased air flow, the valve, instead of being flat, is provided with sides 23, 24 and 25, which project down into the rectangular opening of the valve seat and prevent the passage of air except through the opening 26 at the front end of the valve. The passage of air through such opening, moreover, is partly restricted by forming the opening in the partition 27 with inclined sides, so that as the valve lifts, each additional increment of lift gives a proportionately less increase of cross sectional area for the flow of additional air. After the air consumption begins therefore, additional increases in air consumption effect proportionately greater opening movement of the dampers.

While I have herein shown and described for purposes of illustration one specific form of the invention, it is to be understood that the same is not limited to the details of construction nor to the mode of application herein shown, but that wide deviations may be made therefrom without departing from the spirit of the invention.

I claim:

1. In a compressed air reheater, the combination of a compressed air container for containing the compressed air to be reheated; a separate and distinct combustion chamber; a damper for controlling the draft in said combustion chamber, and controlling means operated by increase of flow of air in said compressed air container to increase the draft in said combustion chamber and by decrease of flow of air in said compressed air container to decrease the draft in said combustion chamber.

2. In a compressed air reheater, the combination of a compressed air container for containing the compressed air to be reheated; a separate and distinct combustion chamber; regulating means for regulating the combustion in said chamber; and controlling means, operated by increase of flow of air in said compressed air container, to increase the heat in said combustion chamber and by decrease of flow of air in said compressed air container to increase the heat in said combustion chamber.

3. In a compressed air reheater, the combination of a compressed air container for containing the compressed air to be reheated; a separate and distinct combustion chamber; a damper for controlling the draft in said combustion chamber, and controlling means operated by increase of flow of air in said compressed air container to increase the draft in said combustion chamber and by decrease of flow of air in said compressed air container to decrease the draft in said combustion chamber, said regulating means having an amplitude of controlling movement increasing disproportionately with the increase of air consumption.

4. In a compressed air reheater, the combination of a compressed air container for containing the compressed air to be reheated; a separate and distinct combustion chamber; a damper for controlling the draft in said combustion chamber and a gate 16 operatively connected to said compressed air retainer, and connected to said damper, whereby said gate is operated by increase of air consumption from said compressed air container to increase the draft in said combustion chamber, and by decrease of air consumption from said compressed air container to decrease the heat in said combustion chamber.

5. In a compressed air reheater, the combination of a compressed air container for containing the compressed air to be re-reheated; a separate and distinct combustion chamber, having an exit flue damper 17 and an entrance flue damper 12; and a gate 7 operated by increase of flow of air in said compressed air container through operative connections to move both said dampers to increase the draft in said combustion chamber and by decrease of flow of air in said compressed air container to move said dampers to decrease the draft in said combustion chamber.

In testimony whereof, I have signed my name to this specification, in the presence of two subscribing witnesses.

FRED D. HOLDSWORTH.

Witnesses:
JOHN A. BATCHELDER,
WILLIS B. DREW.

Copies of this patent may be obtained for five cents each, by addressing the "Commissioner of Patents, Washington, D. C."